US010323998B2

(12) United States Patent
Hanley

(10) Patent No.: US 10,323,998 B2
(45) Date of Patent: Jun. 18, 2019

(54) FLUID PRESSURE SENSOR

(71) Applicant: Sensata Technologies, Inc., Attleboro, MA (US)

(72) Inventor: Brian Hanley, Providence, RI (US)

(73) Assignee: Sensata Technologies, Inc., Attleboro, MA (US)

( * ) Notice: Subject to any disclaimer, the term of this patent is extended or adjusted under 35 U.S.C. 154(b) by 133 days.

(21) Appl. No.: 15/638,646

(22) Filed: Jun. 30, 2017

(65) Prior Publication Data

US 2019/0003913 A1    Jan. 3, 2019

(51) Int. Cl.
*G01L 19/14* (2006.01)
*G01L 19/00* (2006.01)
*G01L 9/00* (2006.01)
*G01L 7/00* (2006.01)

(52) U.S. Cl.
CPC .............. *G01L 19/14* (2013.01); *G01L 19/00* (2013.01); *G01L 19/0038* (2013.01); *G01L 19/0061* (2013.01); *G01L 19/142* (2013.01)

(58) Field of Classification Search
CPC ... G01L 7/00; G01L 9/00; G01L 19/00; G01L 19/0038; G01L 19/0061; G01L 19/14; G01L 19/142
See application file for complete search history.

(56) References Cited

U.S. PATENT DOCUMENTS

| | | |
|---|---|---|
| 3,876,821 A | 4/1975 | Pringle |
| 4,111,517 A | 9/1978 | Debaigt |
| 4,131,088 A | 12/1978 | Reddy |
| 4,287,772 A | 9/1981 | Mounteer et al. |
| 4,347,745 A | 9/1982 | Singh |
| 4,400,681 A | 8/1983 | Brown et al. |
| 4,599,485 A | 7/1986 | Smolik |
| 4,747,506 A | 5/1988 | Stuchlik, III |
| 4,771,427 A | 9/1988 | Tulpule et al. |

(Continued)

FOREIGN PATENT DOCUMENTS

| | | |
|---|---|---|
| CN | 103454032 A | 12/2013 |
| DE | 4234289 C1 | 11/1993 |

(Continued)

OTHER PUBLICATIONS

European Search Report for European Patent Application No. 18179173.2, dated Feb. 27, 2019, 14 pages.

*Primary Examiner* — Nguyen Q. Ha
(74) *Attorney, Agent, or Firm* — Burns & Levinson LLP; Joseph M. Maraia; George N. Chaclas

(57) ABSTRACT

A sensor includes a port body which defines an axial passage for receiving fluid. An electrical connector extends through an opening in the port body near a crimp portion opposite the axial passage and forms an upper seal with the port body. Within the interior of the port body, a support ring and base cover form a cavity which retains a sensing element. The sensing element is exposed to the fluid within the axial passage and determines the pressure. An annular seal is retained by the base cover. The crimp portion of the port body is crimped to provide an upper seal and apply a force on the components within the interior, pinching the annular seal between the sensing element and the base of the port body to create a lower seal.

20 Claims, 17 Drawing Sheets

(56) References Cited

U.S. PATENT DOCUMENTS

| | | | |
|---|---|---|---|
| 4,875,135 A * | 10/1989 | Bishop | G01L 9/0075 361/283.4 |
| 4,888,662 A | 12/1989 | Bishop | |
| 4,903,164 A * | 2/1990 | Bishop | G01L 9/0075 29/25.42 |
| 5,060,108 A | 10/1991 | Baker et al. | |
| 5,101,659 A | 4/1992 | Takeuchi | |
| 5,101,665 A | 4/1992 | Mizuno | |
| 5,144,843 A | 9/1992 | Tamura et al. | |
| 5,181,417 A | 1/1993 | Nishida et al. | |
| 5,184,107 A | 2/1993 | Maurer | |
| 5,184,515 A | 2/1993 | Terry et al. | |
| 5,209,121 A | 5/1993 | Hafner | |
| 5,222,397 A | 6/1993 | Kodama | |
| 5,231,301 A | 7/1993 | Peterson et al. | |
| 5,284,107 A | 2/1994 | Milne et al. | |
| 5,331,857 A * | 7/1994 | Levine | G01L 9/0052 73/706 |
| 5,349,865 A | 9/1994 | Kavli et al. | |
| 5,408,045 A | 4/1995 | Jorgensen et al. | |
| 5,425,371 A | 6/1995 | Mischenko | |
| 5,448,444 A | 9/1995 | Provenzano et al. | |
| 5,457,988 A | 10/1995 | Delatorre | |
| 5,587,535 A | 12/1996 | Sasaki et al. | |
| 5,625,151 A | 4/1997 | Yamaguchi | |
| 5,629,486 A | 5/1997 | Viduya et al. | |
| 5,665,921 A | 9/1997 | Gerst et al. | |
| 5,741,975 A | 4/1998 | Vaughn, II et al. | |
| 5,802,912 A | 9/1998 | Pitzer et al. | |
| 5,827,972 A * | 10/1998 | Balcarek | G01L 9/0072 73/756 |
| 5,866,822 A | 2/1999 | Willig | |
| 5,869,766 A | 2/1999 | Cucci et al. | |
| 5,892,156 A * | 4/1999 | Kathan | G01L 9/0075 73/706 |
| 6,050,145 A | 4/2000 | Olson et al. | |
| 6,055,864 A * | 5/2000 | Stiller | G01L 19/0084 73/718 |
| 6,070,883 A | 6/2000 | Marto | |
| 6,119,524 A | 9/2000 | Kobold | |
| 6,204,594 B1 | 3/2001 | Ingham | |
| 6,351,998 B1 | 3/2002 | Hohnstadt et al. | |
| 6,353,181 B1 | 3/2002 | Jarry et al. | |
| 6,389,903 B1 | 5/2002 | Oba et al. | |
| 6,411,038 B2 | 6/2002 | Murai et al. | |
| 6,439,058 B1 | 8/2002 | Aratani et al. | |
| 6,453,747 B1 | 9/2002 | Weise et al. | |
| 6,487,911 B1 | 12/2002 | Frackelton et al. | |
| 6,497,586 B1 | 12/2002 | Wilson | |
| 6,536,287 B2 | 3/2003 | Beekhuizen et al. | |
| 6,539,787 B1 | 4/2003 | Murai et al. | |
| 6,568,276 B1 | 5/2003 | Ciminelli | |
| 6,700,174 B1 | 3/2004 | Miu et al. | |
| 6,715,357 B2 | 4/2004 | Ishiguro et al. | |
| RE38,557 E | 7/2004 | Englund et al. | |
| 6,763,724 B2 | 7/2004 | DiPaola et al. | |
| 6,876,943 B2 | 4/2005 | Wegerich | |
| 6,945,118 B2 | 9/2005 | Maitland, Jr. et al. | |
| 6,952,042 B2 | 10/2005 | Stratton et al. | |
| 7,021,147 B1 | 1/2006 | Subramanian | |
| 7,032,456 B1 | 4/2006 | Amin | |
| 7,114,396 B2 | 10/2006 | Oda et al. | |
| 7,197,937 B2 | 4/2007 | Amore et al. | |
| 7,207,214 B1 | 4/2007 | Wlodarczyk | |
| 7,302,855 B2 | 12/2007 | Oda | |
| 7,316,164 B2 | 1/2008 | Toyoda et al. | |
| 7,383,737 B1 | 6/2008 | Lin et al. | |
| 7,412,894 B2 | 8/2008 | Ueyanagi et al. | |
| 7,518,234 B1 | 4/2009 | Okojie | |
| 7,555,957 B2 | 7/2009 | Toyoda | |
| 7,570,065 B2 | 8/2009 | Harish et al. | |
| 7,578,194 B1 | 8/2009 | Hadjiloucas et al. | |
| 7,726,197 B2 | 6/2010 | Selvan et al. | |
| 7,739,922 B2 | 6/2010 | Inamori | |
| 7,775,119 B1 | 8/2010 | Suminto et al. | |
| 8,024,978 B2 | 9/2011 | Khemet et al. | |
| 8,056,752 B2 | 11/2011 | Carnevali | |
| 8,104,357 B2 | 1/2012 | Schlitzkus et al. | |
| 8,156,816 B2 | 4/2012 | Willner et al. | |
| 8,164,007 B2 | 4/2012 | Speldrich et al. | |
| 8,215,176 B2 | 7/2012 | Ding et al. | |
| 8,250,909 B2 | 8/2012 | Kern et al. | |
| 8,297,115 B2 | 10/2012 | Borgers et al. | |
| 8,429,956 B2 | 4/2013 | Borgers et al. | |
| 8,516,897 B1 | 8/2013 | Jones et al. | |
| 8,627,559 B2 | 1/2014 | Suminto et al. | |
| 8,671,767 B2 | 3/2014 | Kaiser et al. | |
| 8,950,247 B2 | 2/2015 | Borgers et al. | |
| 8,984,949 B2 | 3/2015 | Staiger et al. | |
| 9,003,897 B2 | 4/2015 | Wade et al. | |
| 9,046,436 B2 | 6/2015 | Schlitzkus et al. | |
| 9,063,033 B2 | 6/2015 | Mayer et al. | |
| 9,103,739 B2 * | 8/2015 | Broden | F16J 15/06 |
| 2001/0015402 A1 | 8/2001 | Murai et al. | |
| 2001/0039837 A1 | 11/2001 | Tanizawa et al. | |
| 2002/0029639 A1 | 3/2002 | Wagner et al. | |
| 2002/0073533 A1 | 6/2002 | Park | |
| 2002/0100948 A1 | 8/2002 | Yoshihara et al. | |
| 2003/0033884 A1 | 2/2003 | Beekhuizen et al. | |
| 2003/0150275 A1 | 8/2003 | Wagner et al. | |
| 2004/0007073 A1 | 1/2004 | Weise | |
| 2004/0007074 A1 | 1/2004 | DiPaola et al. | |
| 2004/0007075 A1 | 1/2004 | Ishiguro et al. | |
| 2004/0015282 A1 | 1/2004 | Babala et al. | |
| 2004/0020300 A1 | 2/2004 | Boehler et al. | |
| 2004/0146719 A1 | 7/2004 | Baney et al. | |
| 2004/0147140 A1 | 7/2004 | Fan et al. | |
| 2004/0200286 A1 | 10/2004 | Mast | |
| 2005/0011273 A1 | 1/2005 | Sasaki et al. | |
| 2005/0103111 A1 | 5/2005 | Imai et al. | |
| 2005/0252300 A1 | 11/2005 | Miller | |
| 2006/0000289 A1 | 1/2006 | Jonsson | |
| 2006/0042393 A1 | 3/2006 | Kaneko et al. | |
| 2006/0042394 A1 | 3/2006 | Kosh et al. | |
| 2006/0042395 A1 | 3/2006 | Lepine et al. | |
| 2006/0053894 A1 | 3/2006 | Kunda et al. | |
| 2006/0090566 A1 | 5/2006 | Oda | |
| 2006/0123887 A1 | 6/2006 | Dordet | |
| 2006/0213276 A1 * | 9/2006 | Ueyanagi | G01L 19/0084 73/754 |
| 2006/0214202 A1 | 9/2006 | Zorich et al. | |
| 2006/0278012 A1 | 12/2006 | Fujimoto et al. | |
| 2007/0148788 A1 | 6/2007 | Hsieh et al. | |
| 2007/0202628 A1 | 8/2007 | Wuertz | |
| 2007/0205776 A1 | 9/2007 | Harish et al. | |
| 2008/0148860 A1 | 6/2008 | Murakami et al. | |
| 2008/0222884 A1 | 9/2008 | Bradley et al. | |
| 2008/0227331 A1 | 9/2008 | Qiu | |
| 2008/0262584 A1 | 10/2008 | Bottomley et al. | |
| 2009/0071260 A1 | 3/2009 | Speldrich | |
| 2009/0075529 A1 | 3/2009 | Johnston et al. | |
| 2009/0282926 A1 | 11/2009 | Hauer et al. | |
| 2009/0315864 A1 | 12/2009 | Silverbrook et al. | |
| 2009/0320576 A1 | 12/2009 | Borgers et al. | |
| 2010/0052578 A1 | 3/2010 | Kim | |
| 2010/0192696 A1 | 8/2010 | Schlitzkus et al. | |
| 2010/0219487 A1 | 9/2010 | Donis | |
| 2010/0239109 A1 | 9/2010 | Lutz et al. | |
| 2010/0267291 A1 | 10/2010 | Chabineau-Lovgren et al. | |
| 2010/0281994 A1 | 11/2010 | Brown et al. | |
| 2011/0088480 A1 | 4/2011 | Koehler et al. | |
| 2011/0108322 A1 | 5/2011 | Kaiser | |
| 2011/0138924 A1 * | 6/2011 | Colombo | G01L 19/0092 73/756 |
| 2011/0153277 A1 | 6/2011 | Morath | |
| 2011/0290030 A1 | 12/2011 | Willner et al. | |
| 2011/0296927 A1 * | 12/2011 | Hopman | G01L 9/0075 73/723 |
| 2011/0320158 A1 | 12/2011 | Steckenreiter et al. | |
| 2012/0067130 A1 | 3/2012 | Kaiser et al. | |
| 2012/0227477 A1 | 9/2012 | Borgers et al. | |
| 2013/0000413 A1 * | 1/2013 | Mitchell | G01L 19/143 73/756 |

(56) References Cited

U.S. PATENT DOCUMENTS

| | | |
|---|---|---|
| 2013/0052936 A1 | 2/2013 | Jordan |
| 2013/0073189 A1 | 3/2013 | Korenaga et al. |
| 2013/0192379 A1 | 8/2013 | Petrarca |
| 2013/0248024 A1 | 9/2013 | Dunn et al. |
| 2013/0264664 A1 | 10/2013 | Nimura et al. |
| 2013/0336511 A1 | 12/2013 | Underbrink et al. |
| 2014/0130585 A1 | 5/2014 | Borgers et al. |
| 2014/0130586 A1 | 5/2014 | Zwollo et al. |
| 2014/0144206 A1 | 5/2014 | Uehlin et al. |
| 2014/0219713 A1 | 8/2014 | Balsells et al. |
| 2014/0260648 A1 | 9/2014 | Aoyama et al. |
| 2014/0338448 A1 | 11/2014 | Ashino |
| 2015/0135853 A1 | 5/2015 | McNeal et al. |
| 2015/0377729 A1 | 12/2015 | Hio et al. |
| 2016/0025581 A1 | 1/2016 | Kazama et al. |
| 2016/0133762 A1 | 5/2016 | Blasco Claret |
| 2016/0265998 A1 | 9/2016 | Lavado et al. |
| 2016/0282205 A1 | 9/2016 | Huo et al. |
| 2017/0191895 A1 * | 7/2017 | Eckhardt ............... G01L 19/147 |
| 2018/0275006 A1 * | 9/2018 | Osawa .................. G01L 19/142 |

FOREIGN PATENT DOCUMENTS

| | | | |
|---|---|---|---|
| DE | 4407212 C1 | 8/1995 | |
| DE | 10012169 A1 * | 9/2000 | ......... G01L 19/0038 |
| DE | 102004048367 A1 | 4/2006 | |
| EP | 085584 A1 | 8/1983 | |
| EP | 1074827 A2 | 2/2001 | |
| EP | 1118849 | 7/2001 | |
| EP | 1211497 A2 | 6/2002 | |
| EP | 1560012 A1 | 8/2005 | |
| EP | 1826543 A2 | 8/2007 | |
| EP | 2390641 A2 | 11/2011 | |
| EP | 2620757 A1 | 7/2013 | |
| EP | 2848908 A1 | 3/2015 | |
| FR | 2791430 A1 | 9/2000 | |
| FR | 2862755 B1 * | 12/2006 | ......... G01L 19/0645 |
| GB | 2066590 A | 7/1981 | |
| JP | 406037334 | 2/1994 | |
| JP | 2000329633 A * | 11/2000 | ......... G10L 19/0038 |
| JP | 2009195085 A | 8/2009 | |
| JP | 2010256187 A | 11/2010 | |
| WO | WO-0242720 A2 | 5/2002 | |
| WO | WO-2003100371 A1 | 12/2003 | |
| WO | WO-2006102460 A1 | 9/2006 | |
| WO | WO-2011155054 A1 | 12/2011 | |
| WO | WO-2013083320 A1 | 6/2013 | |
| WO | WO-2013110045 A1 | 7/2013 | |
| WO | WO-2014132730 A1 | 9/2014 | |

* cited by examiner

FLUID PRESSURE SENSOR

FIELD OF THE INVENTION

The subject disclosure relates to sensing technology and more particularly to devices for sensing fluid pressure.

BACKGROUND OF THE INVENTION

Various pressure sensors, such as Automotive Pressure Transducers (APTs), employ Ceramic Capacitive Sense Elements (CSEs) to sense pressure. Square CSEs were developed to improve manufacturing of the sense elements, but have been limited to a maximum application pressure of around 35 bar. Further, APTs are assembled using a crimping process which deforms a metal pressure port wall onto a plastic base component to retain the sensor package, load the internal seal, and create a gland into which an environmental sealant can be dispensed.

SUMMARY OF THE INVENTION

In an example of one design, the plastic base component is split into two separate components, one to load the internal seal, and the second to provide external electrical connection. Both components are required to be retained in the package and immobile. The internal seal and the internal components should be reliably loaded. Due to tolerances of the seal and the components forming the gland for the seal, clearance can exist around the gland presenting locations where the seal can extrude. In high pressure systems, backup rings are frequently used as a means to prevent the extrusion of seals. The subject disclosure provides a mechanism to reduce and control seal extrusion. The subject technology overcomes many of the prior art problems associated with sensor and non-sensor applications. In one aspect of one embodiment, the subject technology relates to a pressure sensor with an improved maximum allowable pressure range which distributes loads to effectively seal the sensor while retaining all components aligned in the assembly. The subject technology further relates to a seal, and components for retaining the seal, which maintain an effective seal even when subjected to high pressure and without hampering accuracy of the sensing device.

In one embodiment, the subject technology relates to a pressure sensor for sensing the pressure of a fluid. The sensor includes a port body with a distal end defining an axial passage for receiving the fluid. A first sidewall extends from the distal end of the port body and terminates in a proximal crimp portion defining an opening. The sensor has an electrical connector with a shoulder extending through the opening. The connector has a flexible radial flange within the port body. Together, the electrical connector and port body define an interior for a plurality of components. A support ring in the interior has an upper surface with a radially inward ledge that acts as a stop for the shoulder and, in turn, sets a gap between the upper surface and the flexible flange. When the proximal crimp portion is crimped down on the flexible flange, an upper seal is formed.

The sensor can also include a base cover in the interior between the support ring and the axial passage. The base cover and support ring can form a cavity and retain a sense element assembly therewithin. One or more contact pads can be disposed on a surface of the sense element assembly. In some embodiments, the support ring is a conductive metal and the proximal crimp portion applies a loading force to the support ring, causing the support ring to maintain contact with the one or more contact pads. In some cases, the support ring can also be a more rigid material than the electrical connector, for example, so that more force is needed to deform the support ring. In some embodiments, an environmental sealant is applied to a junction of the proximal crimp portion and the flexible flange.

In some embodiments, the subject technology relates to a pressure sensor with a port body having a distal end defining an axial passage. The port body further includes a first sidewall extending from the distal end to define an interior. A base cover in the interior includes a side wall and a skirt defining an axial bore. The skirt has a ledge extending radially inward from the skirt and terminating in two opposing annular ridges to form a recess therebetween. A sense element within the interior is exposed to a fluid via the axial bore. An annular seal, seated at least partially within the recess, is compressed between the sense element and the port body to seal the interior from the fluid. As a result of the opposing annular ridges, extrusion of the annular seal is beneficially reduced or prevented.

In other embodiments, the annular seal, when not compressed, has the shape of a cylindrical ring with an outer diameter and a central diameter. Further, the annular seal, when not compressed, can have an outer diameter that is less than a central diameter of the recess such that a gap is formed between the annular seal and the recess. The opposing annular ridges can have inner diameters that are greater than the central diameter of the annular seal. Further, one of the opposing annular ridges can have an inner diameter that is less than the outer diameter of the annular seal. The annular ridges can be thin such that when a compression force causes the annular seal to expand radially outward within the recess, the annular ridges will flex while retaining the annular seal in the recess.

In different embodiments, the subject technology relates to an elongated pressure sensor with a support ring. At least one axial channel extends through the support ring. The pressure sensor also includes an electrical connector with at least one latch extending into the at least one axial channel of the support ring. A base cover with at least one upstanding finger extends into the at least one axial channel of the support ring and couples with the at least one latch of the electrical connector. In some embodiments, the sensor also includes a sense element assembly disposed in between the base cover and the support ring. When the at least one upstanding finger is coupled to the at least one latch, the electrical connector, support ring, sense element assembly, and base cover resist movement with respect to one another.

In several embodiments, the sense element assembly includes a circuit module coupled to a sense element, the circuit module having at least one contact pad on an upper surface. The support ring is a conductive material and is also grounded. When the at least one upstanding finger is coupled to the at least one latch, the at least one contact pad is held in contact with the support ring to ground the circuit module. Further, each of the at least one axial channels can further include axial recesses in an outer sidewall of the support ring. When the at least one finger is coupled to the at least one latch, the axial recesses house the at least one finger and resists twisting of the base cover with respect to the support ring.

In certain embodiments, the subject technology relates to a pressure sensor with a port body defining an interior. A conductive support ring in the interior has a contact surface. A sense element assembly is also located in the interior. A circuit module is electrically connected to the sense element assembly and has at least one pad between the circuit module and the contact surface. The at least one pad provides an electrical ground contact through the support ring for preventing electromagnetic interference on the sense element assembly. In some embodiments, the conductive ring is in contact with the port body and the port body is grounded. Further, a seal can provide a loading force to maintain contact between the at least one pad and the support ring. In some embodiments, the support ring is symmetric around a central plane for simplified assembly.

The subject technology also relates, in other embodiments, to an elongated pressure sensor for sensing a pressure associated with a fluid. A port body includes a distal end defining an axial passage for receiving the fluid. The port body has a first sidewall extending from the distal end and terminating in a proximal crimp portion that defines an opening. The pressure sensor has an electrical connector with a shoulder extending through the opening. The shoulder has a flexible flange within the port body. Together, the electrical connector and port body define an interior. A conductive support ring in the interior has a lower contact surface and an upper surface having a radially inward ledge that acts as a stop for the shoulder and, in turn, sets a gap between the upper surface and the flexible flange. At least one axial channel extends between the upper surface and lower surface of the conductive support ring. At least one latch extends distally from the electrical connector into the at least one axial channel of the support ring. A base cover in the interior includes at least one upstanding finger that extends proximally into the at least one axial channel of the support ring and couples with the at least one latch of the electrical connector. The base cover also has a skirt defining an axial bore and having a ledge extending radially inward from the skirt and terminating in two opposing annular ridges to form a recess therebetween. A sense element is positioned within a cavity defined by the electrical connector, the support ring, and the base cover. The sense element has a lower surface exposed to the fluid via the axial bore. A circuit module within the cavity is coupled to the sense element, the circuit module having at least one contact pad touching the lower surface of the support ring. An annular seal is positioned within the recess, the annular seal contacting the port body, base cover, and sense element to form a lower seal between the axial passage and the cavity. Further, the proximal crimp portion is crimped down on the flexible flange to form an upper seal and apply a force to the conductive support ring. This force keeps the conductive support ring in grounded electrical contact with the at least one contact pad to prevent electromagnetic interference on the circuit module and sense element. Further, the force ensures the annular seal is compressed to maintain the lower seal.

BRIEF DESCRIPTION OF THE DRAWINGS

So that those having ordinary skill in the art to which the disclosed system pertains will more readily understand how to make and use the same, reference may be had to the following drawings.

DETAILED DESCRIPTION

Figure 1:
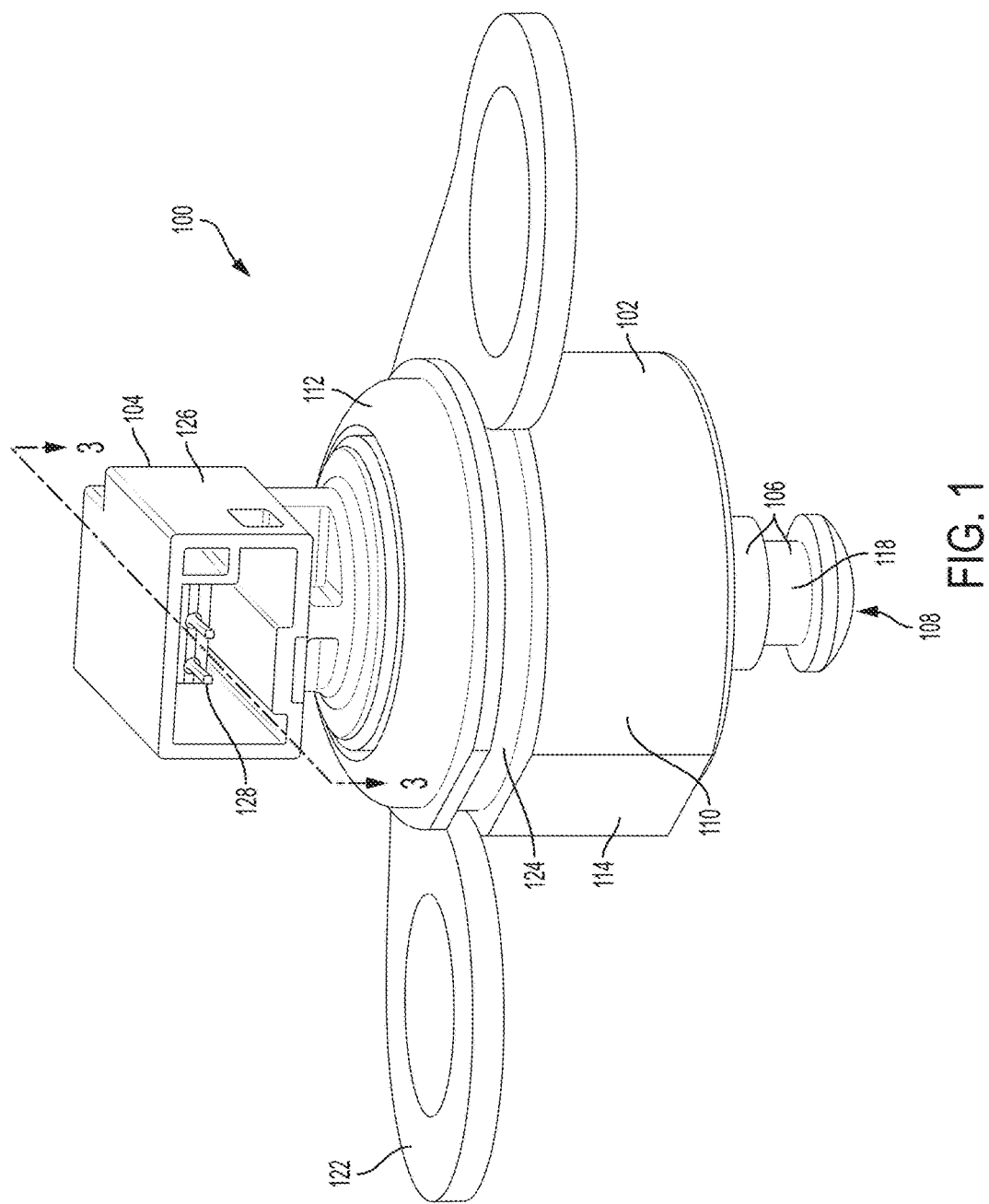
FIG. 1 is a front perspective view of a pressure sensor in accordance with the subject technology.

The subject technology overcomes many of the prior art problems associated with sensors. The advantages, and other features of the systems and methods disclosed herein, will become more readily apparent to those having ordinary skill in the art from the following detailed description of certain preferred embodiments taken in conjunction with the drawings which set forth representative embodiments of the present invention. Like reference numerals are used herein to denote like parts. Further, words denoting orientation such as "upper", "lower", "distal", and "proximate" are merely used to help describe the location of components with respect to one another. For example, an "upper" surface of a part is merely meant to describe a surface that is separate from the "lower" surface of that same part. No words denoting orientation are used to describe an absolute orientation (i.e. where an "upper" part must always be on top).

Referring now to FIG. 1, a fully assembled sensor 100 in accordance with the subject technology is shown. The sensor 100 is well-suited for high-pressure environments such as automotive environments. For example, the sensor 100 can be used anywhere under the hood such as on the engine block of a motor vehicle or equivalent to sense pressure of a particular fluid within the motor vehicle (i.e. oil, transmission fluid, cylinder pressure, or the like). It is envisioned that the sensor 100 could also be mounted within a transmission or outside of a transmission. It is envisioned that the subject technology is broadly applicable to any type of sensor.

The sensor 100 includes a port body 102 connected to an electrical connector 104. The port body 102 includes a distal end 106 defining an axial passage 108 for receiving a fluid. A sidewall 110 extends from the distal end 106, terminating in a proximal crimp portion 112. The proximal crimp portion 112 of the port body 102 and the electrical connector 104 couple to form an upper seal around an interior as discussed more fully herein. The electrical connector 104 has a proximal end 126 with a female connector with pins 128 which allow a circuit module within the interior (See FIGS. 2 and 3) to be electrically connected with external components. Hardware attachment wing 122 sits within recess 124 of the port body 102 and allows the sensor 100 to be mechanically fixed to an external structure to hold the sensor 100 in place.

Figure 2:
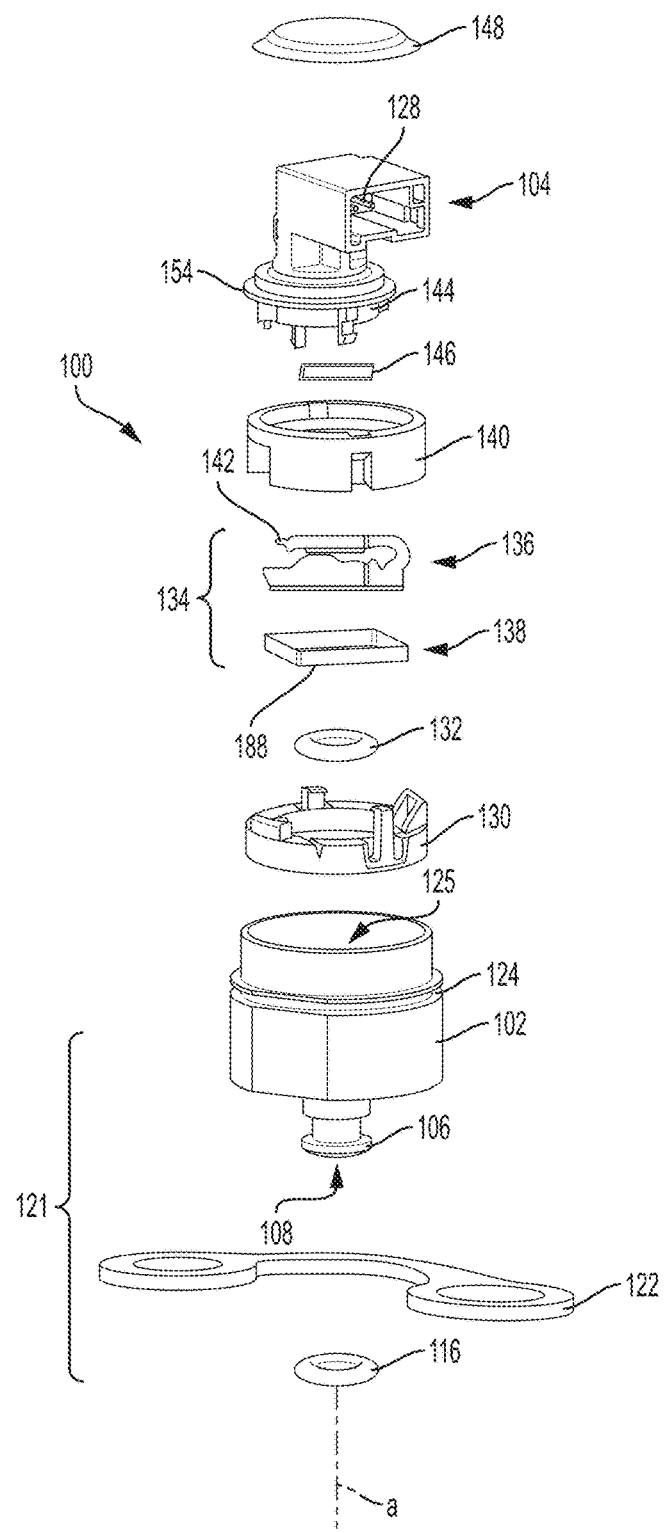
FIG. 2 is an exploded view of a pressure sensor in accordance with the subject technology.
Figure 3:
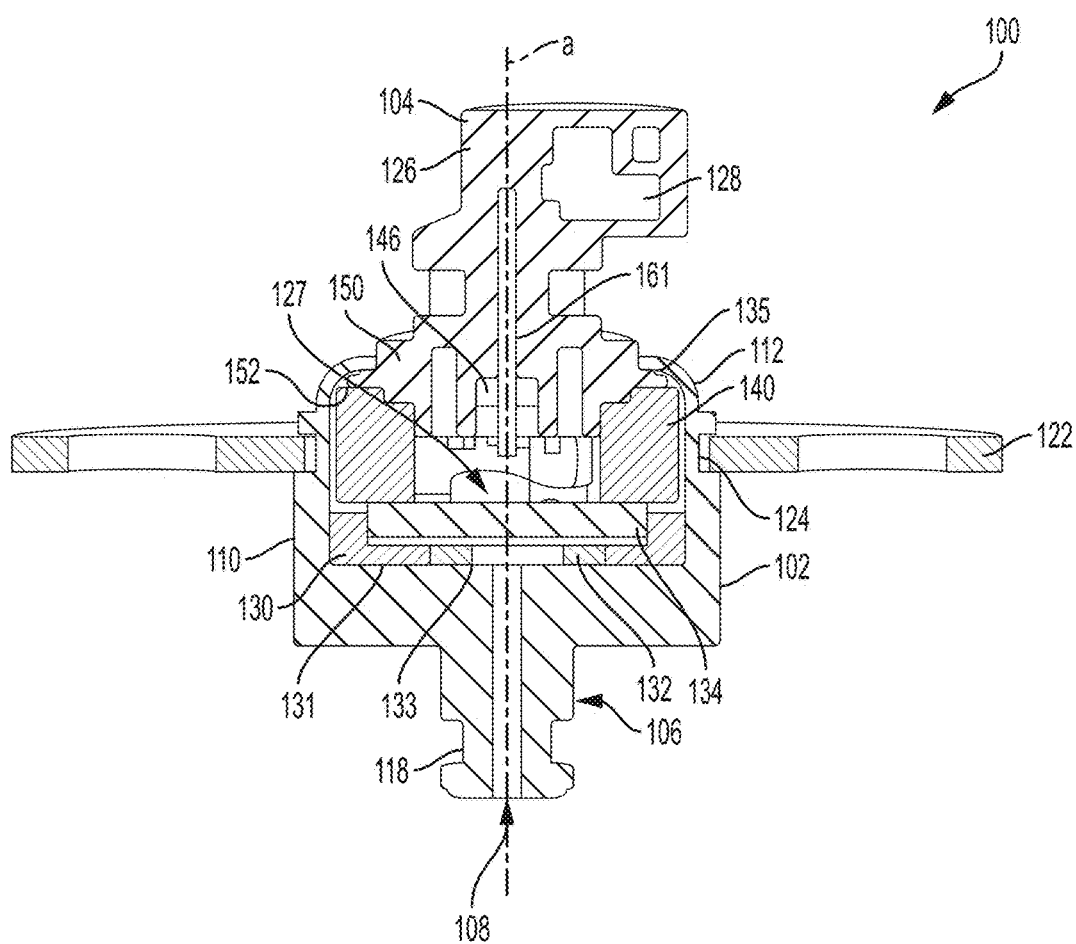
FIG. 3 is a cross-sectional view of a pressure sensor in accordance with the subject technology.

Referring now to FIGS. 2 and 3, exploded and sectional views of a sensor 100 are shown. When the sensor 100 is fully assembly (i.e. see FIG. 3), the port body 102 extends from the distal end 106 which defines the axial passage 108 to a proximal crimp portion 112 that defines an opening 127. The electrical connector 104 has a shoulder 150 which extends through the opening in the proximal crimp portion 112. The port body 102 and electrical connector 104 define an interior 125 for the other components of the sensor 100.

The interior 125 encloses a base cover 130 and a support ring 140 that define an interior cavity 127. The cavity 127 houses a sense element assembly 134 which has a lower surface 188 exposed to fluid within the axial passage 108 via an axial bore 194 within the base cover 130 (See FIG. 7). The sense element assembly 134 includes a circuit module 136 and a sense element 138. The sense element assembly 134 forms an electrical connection with external components via the contact pins 161. The sense element assembly 134 has the ability to sense the pressure of fluid within the axial passage 108. For example, the sense element 138 may include capacitive sense elements, piezoresistive elements designed to measure to flexure of a diaphragm, or the like. The circuit module 136 is coupled to sense element 138 for processing, transmitting, and/or storing signals from the sense element 138.

To help seal the cavity 127 from fluid within the axial passage 108, an annular seal 132 is provided in between a bottom surface 131 of the port body 102, base cover 130, and sense element 138 to form a lower seal 133. An upper seal 135 is also formed between the electrical connector 104, the port body 102, and a support ring 140 within the interior 125 of the port body 102. In some cases, an environmental sealant 148 helps seal the parts of the upper seal together.

Figure 4:
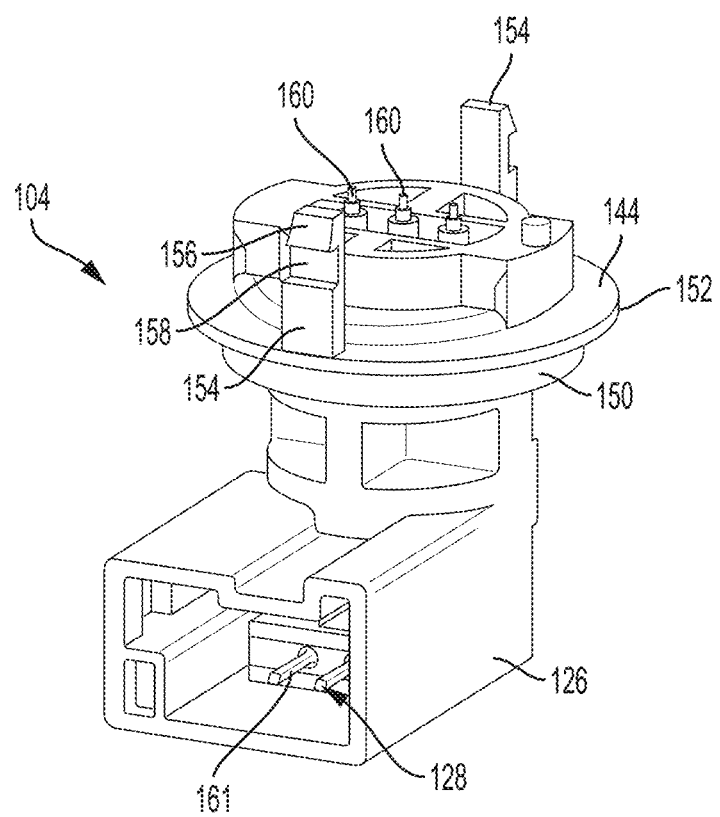
FIG. 4 is a bottom perspective view of an electrical connector for a pressure sensor in accordance with the subject technology.

Referring now to FIG. 4, a bottom perspective view of the electrical connector 104 of the sensor 100 of FIG. 1 is shown. Distal contact pins 160 protrude from the electrical connector 104. The contact pins 161 are fed through sockets 180 (See FIG. 6) on the circuit module 136 to form an electrical connection. Proximal contact pins 161 extend out of the electrical connector 104. External devices can then be connected to the contact pins 161 to place the circuit module 136 in electrical connection with external devices when the sensor 100 is fully assembled.

Still referring to FIG. 4, the shoulder 150 of the electrical connector 104 is sized to fit within the port body 102. The shoulder 150 has a flexible flange 152 which extends around the shoulder 150. When the sensor 100 is fully assembled, the shoulder 150 extends through the opening 127 of the port body 102 and the flexible flange 152 is positioned within the interior 125 of the port body 102. The electrical connector 104 also has two latches 154 extending from the distal end 144. As shown, the latches 154 are configured to grip an object (i.e. the support ring 140 or the base cover 130) at opposing areas. The latches 154 terminate in banking surfaces 156. Proximate to the banking surfaces 156 are detents 158 which catch a corresponding finger 196 of the base cover 130 (See FIGS. 3 and 7). The latches 154 are as flexible as needed to catch the finger 196 and provide interconnection between the electrical connector 104 and the base cover 130.

Figure 5A:
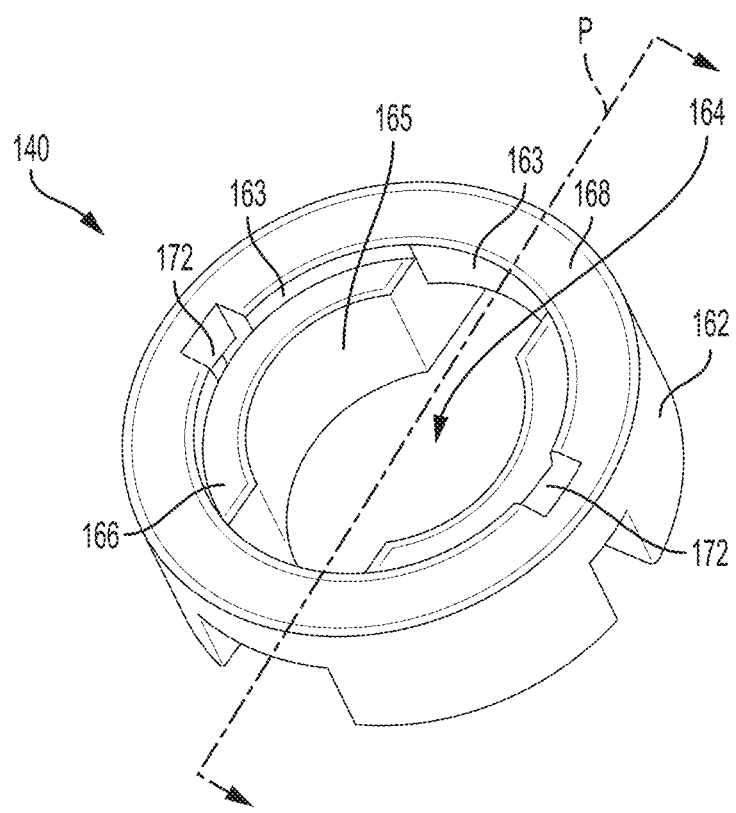
FIG. 5A is a top perspective view of a support ring for a pressure sensor in accordance with the subject technology.
Figure 5B:
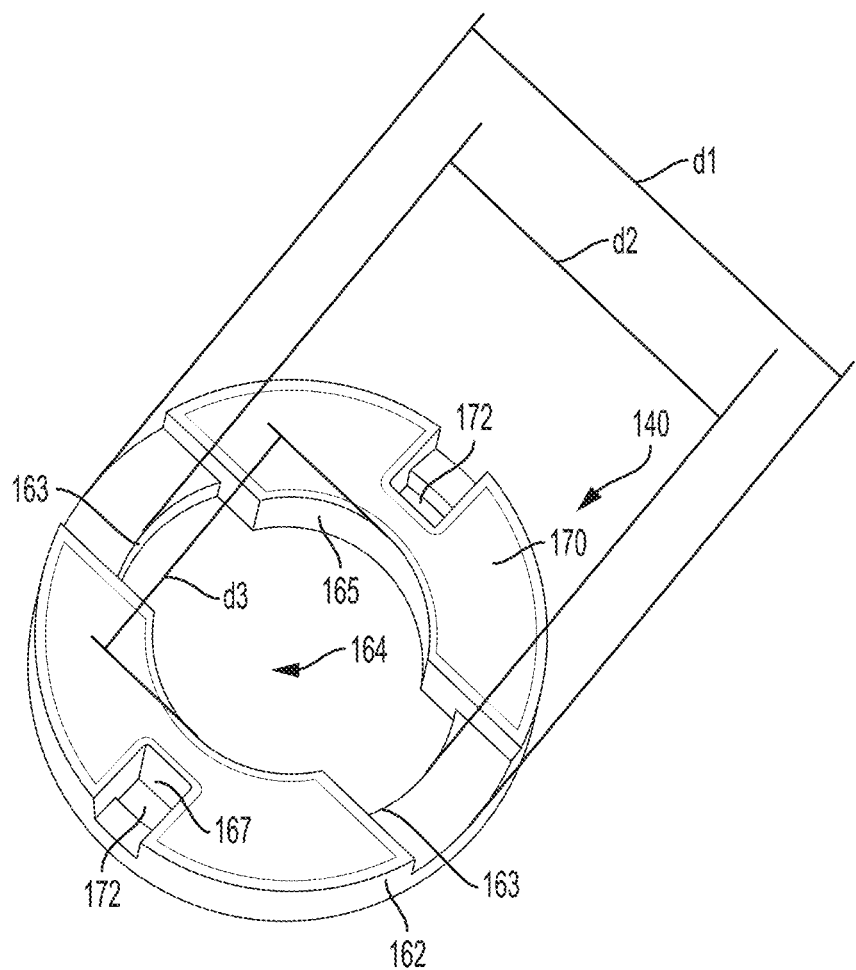
FIG. 5B is a bottom perspective view of a support ring for a pressure sensor in accordance with the subject technology.

Referring now to FIGS. 5A and 5B, the support ring 140 is shown isolated from the other components of the sensor 100. The support ring 140 is symmetric around a central plane "p" which allows for a simplified assembly (i.e. there is no need to align and/or join multiple parts). The support ring 140 has a proximal (or upper) surface 168 that defines at least a keyhole-shaped interior axial void 164. In some embodiments the interior axial void 164 is not keyhole-shaped. The axial void 164 helps form the cavity 127 within which the circuit module 136 sits. The support ring 140 includes an outer wall 162 with a first diameter "d1" and a first inner wall 163 with a second diameter "d2" partially defining the interior axial void 164. The axial void 164 is further defined by a second inner wall 165 of a third diameter "d3" which also provides two opposing radial ledges 166. The ledges 166 are beneath the proximal surface 168 of the support ring 140, and act as a stop for the shoulder 150 of the electrical connector 104. When the shoulder 150 is seated within the radial ledges 166, a gap 208 (See FIG. 9A) is formed between the proximal surface 168 and the flexible flange 152 of the electrical connector 104. The support ring 140 also has a distal contact surface 170 that interfaces with the sense element assembly 134.

Two axial channels 172 extend through the support ring 140 between the top surface 168 and bottom surface 170. The axial channels 172 allow the electrical connector 104, support ring 140, and base cover 130 to be coupled together. The latches 154 of the electrical connector 104 slide through the axial channels 172 to align the support ring 140 and the electrical connector 104 and prevent the electrical connector 104 from rotating with respect to the support ring 104. Fingers 196 from the base cover 130 also slide into the axial channels 172, further sitting within notches 167 in the support ring 140, and lock with the latches 154. When the fingers 196 and latches 154 lock, the electrical connector 104 is held against the proximal side of the radial ledges 166 of the support ring 140. Further, the base cover 130 holds the sense element assembly 134 against the distal surface 170 of the support ring 140. In this way, connecting the latches 154 with the fingers 196 prevents significant axial and rotational movement between the electrical connector 104, support ring 140, sense element assembly 134, and base cover 130. As a result, assembly of the sensor 100 is easy and reliable.

The port body 102 acts similar to a Faraday cage to disallow, reduce, or minimize the influence of radio frequency and other electrical noise. The port body 102 better protects the sense element assembly 134 when the sensor is electrically coupled to the port body 102. Thus, the support ring 140 is preferably made of a conductive material to allow for electrical coupling between the circuit module 136, sense element assembly 134, and port body 102. The support ring 140, while necessary to couple to the port body 102, is less impactful on actual prevention of interference than the port body 102 itself. In some embodiments, the circuit module 136 contains contact pads 176 (See FIG. 6). When the sense element assembly 134 is held against the support ring 140, the contact pads 176 provide improved electrical coupling to the port body 102 and further prevent electromagnetic interference along the sense element assembly 134. Notably, while two axial channels 172, two latches 154, and two fingers 196 are shown, this is only by way of example. Different numbers of each of these components could be used (i.e. one, three, four, etc.) to accomplish the goals of the subject technology.

Figure 6:
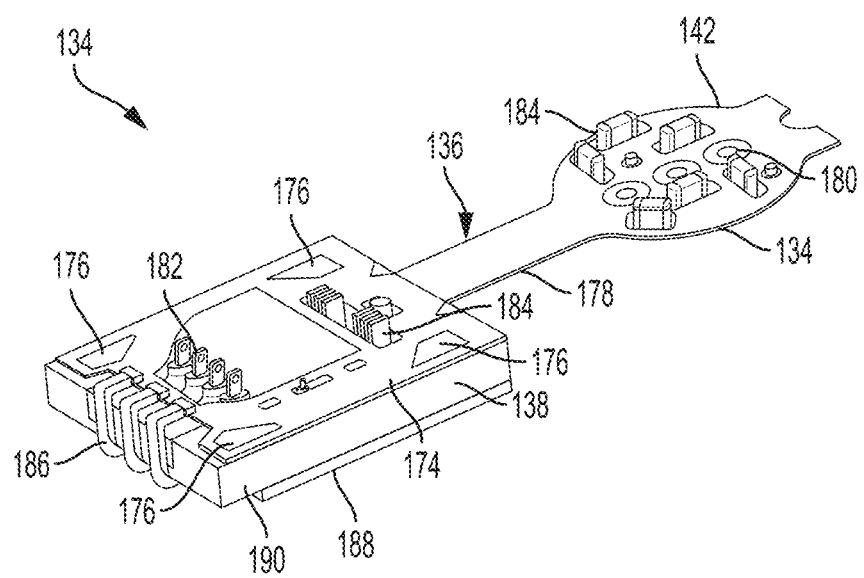
FIG. 6 is a top perspective view of a sense element assembly for a pressure sensor in accordance with the subject technology.

Referring now to FIG. 6, a top perspective view of the sense element assembly 134 for the sensor 100 is shown. The sense element assembly 134 includes a circuit module 136 and a sense element 138. Typically, the sense element 138 is disposed with a distal end 188 exposed to a fluid channel (i.e. via the axial bore 108 in the port body 102). The sense element 138 may include a ceramic substrate surrounding sub-sensing elements (not distinctly shown) for measuring pressure within the fluid channel. For example, the sub-sensing elements may include capacitive sense elements, piezoresistive elements designed to flexure on a diaphragm, or the like. The circuit module 136 sits directly on top of the sense element 138 and forms an electrical connection with the sub-sensing elements, for example, via lead lines 186.

In general, the circuit module 136 has various components for receiving, processing, storing, and transmitting signals from the sub-sensing elements. For example, the circuit module 136 can be a printed circuit board containing one or more application specific integrated circuits, or the like. When the sensor 100 is fully assembled, a proximal end 142 of the circuit module 136 extends through the axial void 164 of the support ring 140 and attaches to a distal end 144 of the electrical connector 104. This coupling may be mechanical. A sealant 146 seals the interface between the contact pins 161 and the electrical connector 104. A flexible bridge 178 of the circuit module 136 allows the proximal end 142 of the circuit module 136 to rotate 180 degrees or more and bend over the square end 174. One or more pins 161 of the electrical connector 104 are soldered or otherwise engaged to one or more sockets 180 on the proximal end 142 to create an electromechanical connection between the pins 161 and the sense element assembly 134. Typically, the attachment of the electrical connector 104 to the sense element assembly 134 is achieved through soldering.

The square end 174 of the circuit module 136 also has one or more electrical contact pads 176. The electrical contact pads 176 reduce unwanted electromagnetic interference to improve performance and accuracy of the sense element assembly 134. In some cases, the support ring 140 is a conductive metal which is grounded via a connection to the port body 102 or via another connection to a grounded conductive material. Therefore the pads 176 can be held in contact with the support ring 140 to electrically couple the sense element assembly 134 to the port body 102 and prevent electromagnetic interference.

Figure 7:
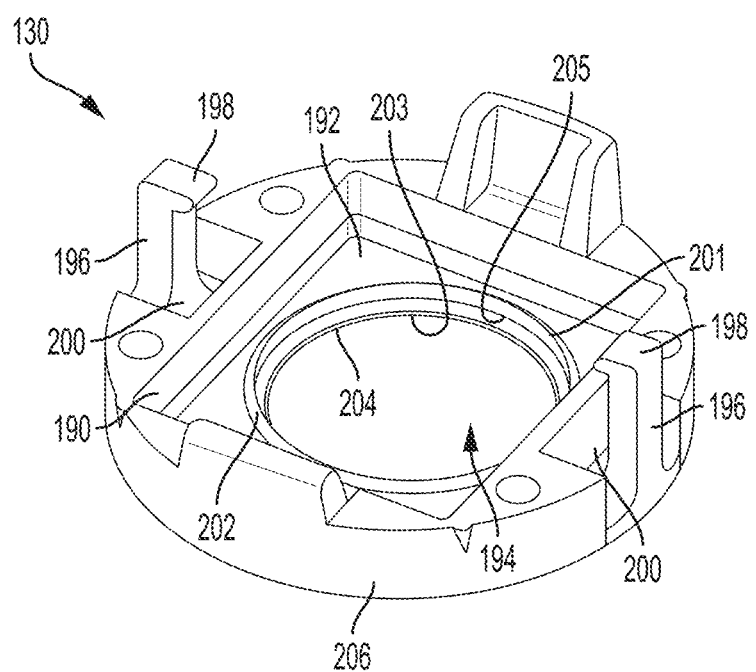
FIG. 7 is a perspective view of a base cover for a pressure sensor in accordance with the subject technology.

Referring now to FIG. 7, a top perspective view of the base cover 130 for the sensor 100 is shown. The base cover 130 is circular and fits within the interior 125 of the port body 102. The base cover 130 includes an outer side wall 206 and an inner side wall 190 that defines a rectangular recess 192 for retaining the sense element assembly 134. The inner sidewall 190 also includes an axial through bore 194 surrounded by a skirt 202. The skirt 202 has a ledge 204 extending radially inward and surrounding the axial bore 194. The ledge 204 terminates in two opposing annular ridges 201, 203 to form a recess 205 (see FIGS. 12A and 12B) therebetween. The recess 205 can retain an annular seal 132, as discussed more fully herein.

When the sensor 100 is fully assembled, the base cover 130 has two upstanding fingers 196 that extend through the notches 167 of the axial channels 172 of the support ring 140 and couple with the latches 154 of the electrical connector 104. The upstanding fingers 196 have shelves 198 extending radially inward that catch the detents 158 of the latches 154. The shelves 198 partially extend over rectangular holes 200 which provides additional flexibility to the fingers 196.

Figure 8A:
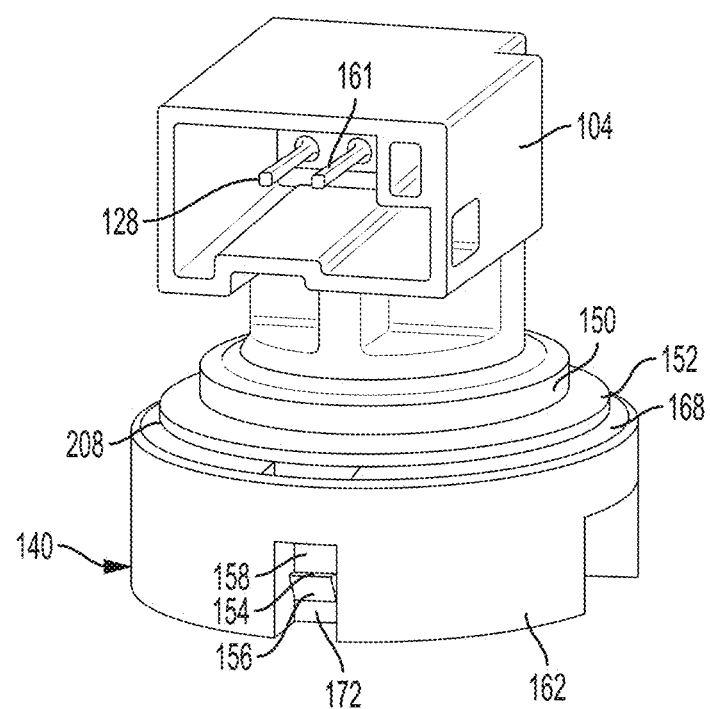
FIG. 8A is a top perspective view of an electrical connector, sense element assembly, and support ring assembled together for a pressure sensor in accordance with the subject technology.
Figure 8B:
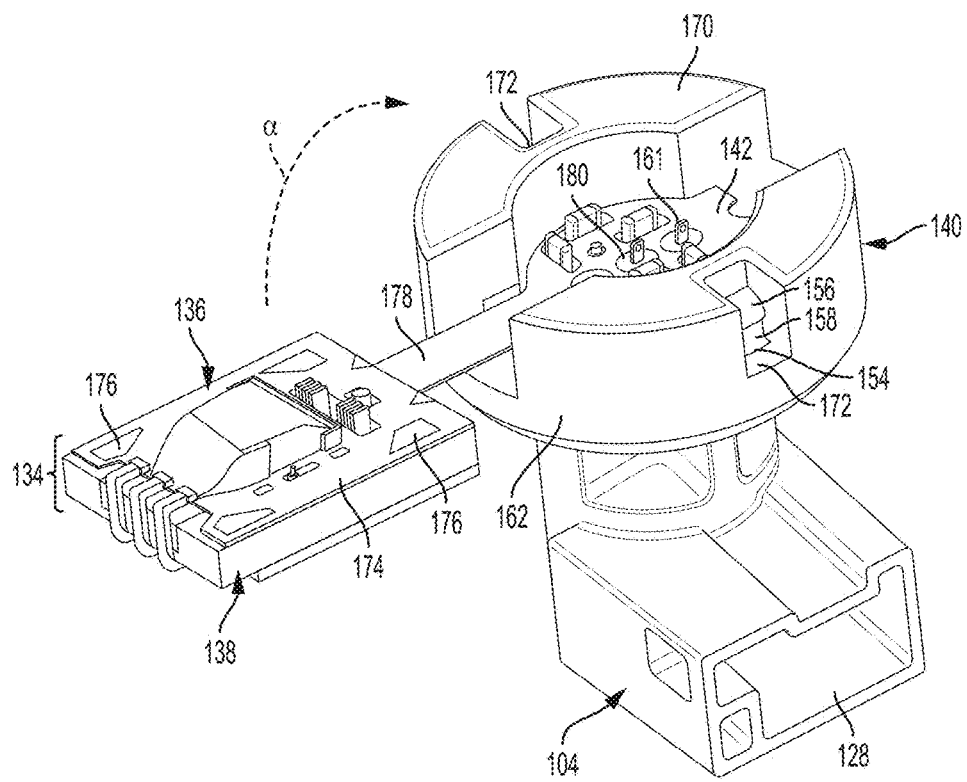
FIG. 8B is a bottom perspective view of an electrical connector, sense element assembly, and support ring for a pressure sensor in accordance with the subject technology.

Referring now to FIGS. 8A and 8B, the electrical connector 104, sense assembly 134, and conductive support ring 140 are shown assembled together. The pins 161 of the electrical connector 104 electrically couple to the sockets 180 of the circuit module 136. The electrical connector 104 and the proximal end 142 of the circuit module 136 rest inside the keyhole-shaped axial void 164 of the support ring 140 such that the proximal surface 168 of the support ring 140, acts as a stop for the shoulder 150 of the electrical connector 104. This serves, in turn, to set a gap 208 between the proximal surface 168 of the support ring 140 and the flexible flange 152 of the electrical connector 104, prior to formation of the upper seal 135. The gap 208 gives the flexible flange 152 space to bend when the electrical connector 104 is sealed to the port body 102, as described more fully herein.

The latches 154 of the electrical connector 104 extend through the axial channels 172 of the support ring 140. The banking surfaces 156 and detents 158 of the latches 154 are visible through the axial channels 172 and are positioned to catch the fingers 196 of the base cover 130. The flexible bridge 178 of the circuit module 136 allows the square end 174 of the sense element assembly 134 to bend along arrow "a" such that the four electrical pads 176 electrically contact the support ring 140 and prevent electromagnetic interference.

Figure 9A:
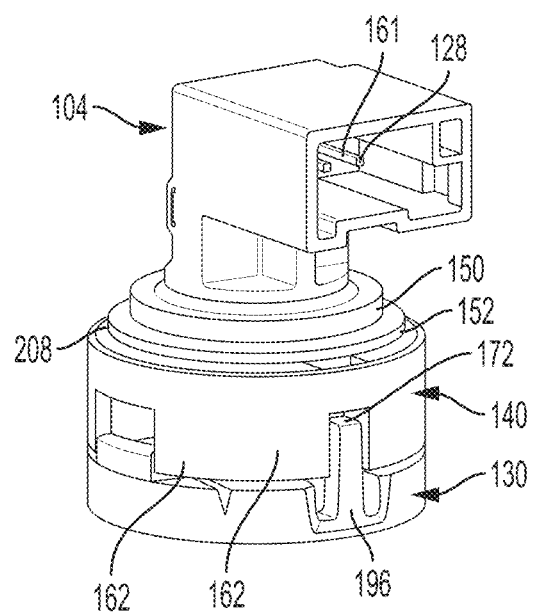
FIG. 9A is a top perspective view of an electrical connector, sense element assembly, support ring, and base cover assembled together for a pressure sensor in accordance with the subject technology.
Figure 9B:
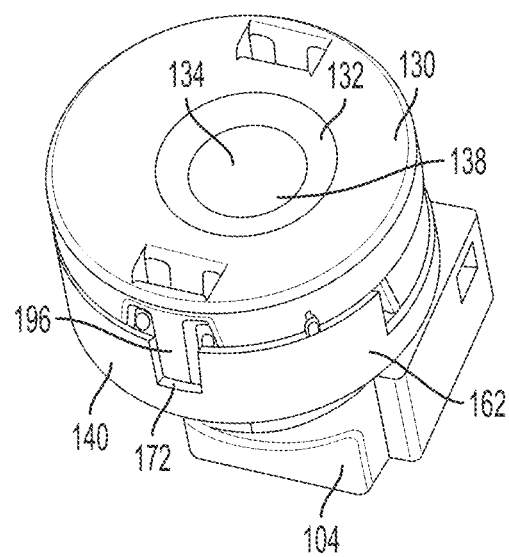
FIG. 9B is a bottom perspective view of an electrical connector, sense element assembly, support ring, base cover, and annular seal for a pressure sensor in accordance with the subject technology.

Referring now to FIGS. 9A and 9B, the electrical connector 104, sense assembly 134, conductive support ring 140, annular seal 132, and base cover 130 are shown assembled together. The annular seal 132 rests inside of the base cover 130 and presses upon the lower surface 188 of the sense element assembly 134. The fingers 196 of the base cover 130 extend through the notches 167 in the axial channels 172 of the support ring 140, and catch the latches 154 of the electrical connector 104. The fingers 196 and the latches 154 coupling together, as well as their location within the axial channels 172 and notches 167, keeps the assembled parts of FIGS. 9A and 9B together by resisting axial and rotational movement.

Figure 10A:
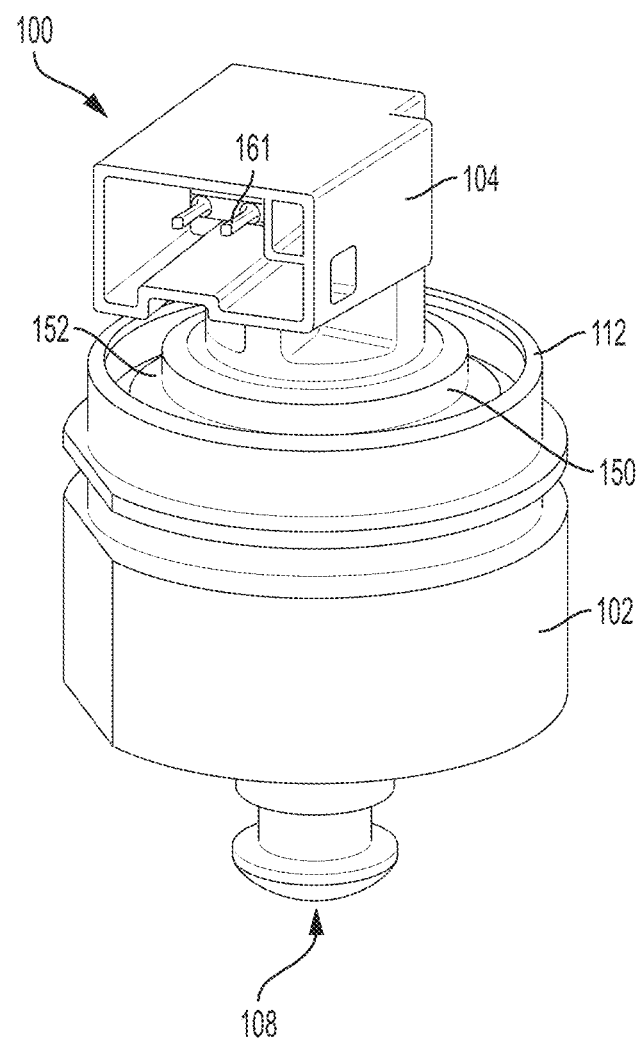
FIG. 10A is a front perspective view of a pressure sensor in accordance with the subject technology prior to being crimped.
Figure 10B:
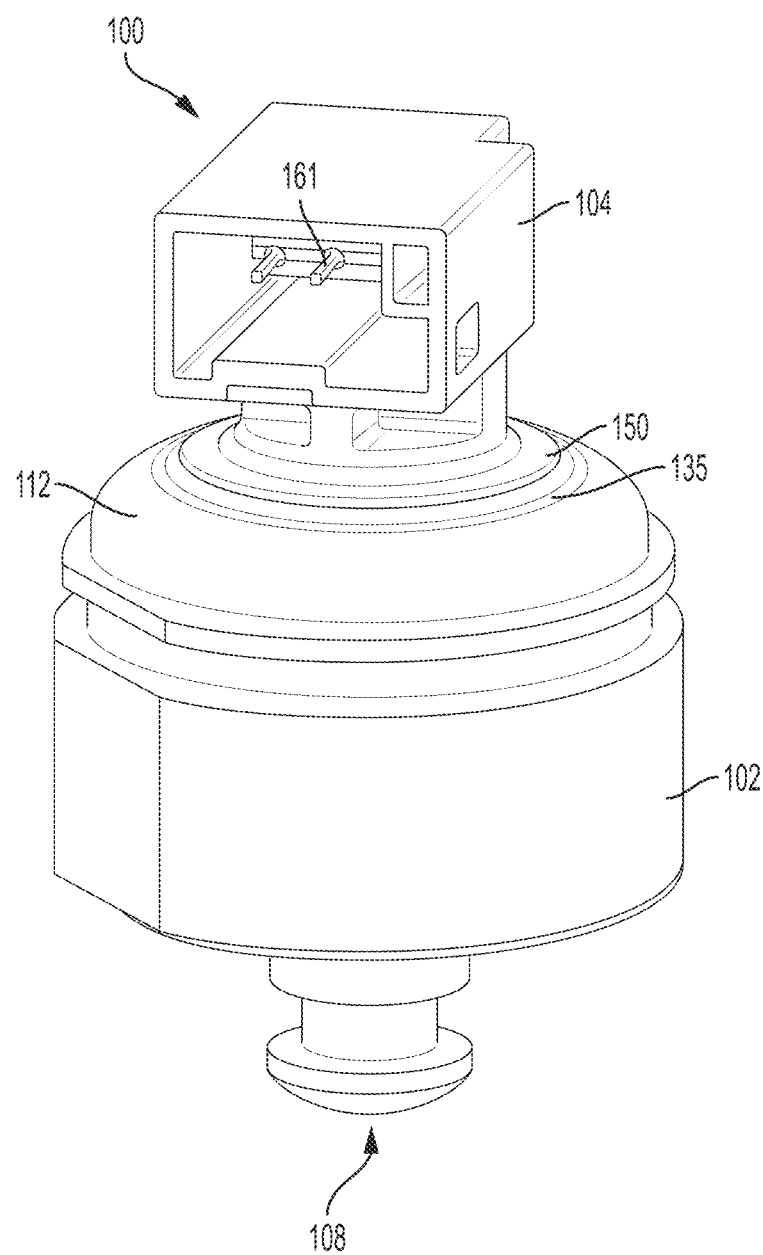
FIG. 10B is a front perspective view of a pressure sensor in accordance with the subject technology after being crimped.
Figure 11:
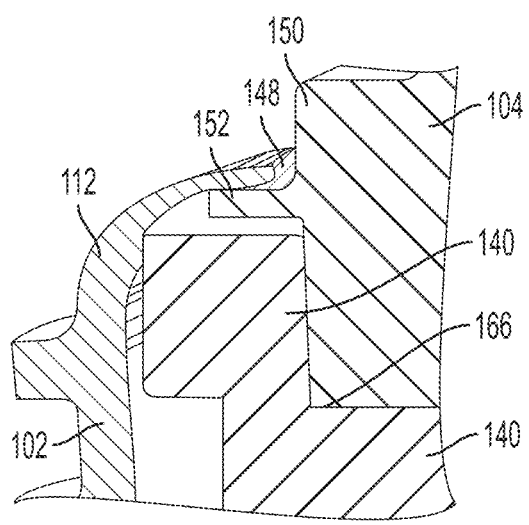
FIG. 11 is a detailed partial cross-sectional view of the pressure sensor of FIG. 10B.

Referring now to FIGS. 10A, 10B and 11, a crimping technique can be used to form an upper (or proximate) seal 135 on the sensor 100. FIG. 10A shows the sensor 100 in a position where the parts have been assembled but the upper seal 135 has not been formed. On the other hand, FIGS. 10B and 11 show the sensor 100 with an upper seal 135 that has been formed by crimping (the process of creating a crimp), as described herein.

As discussed above, the shoulder 150 of the electrical connector 104 is seated, within the interior 125 of the port body 102 on a ledge 166 of the support ring 140. The flexible flange 152 of the electrical connector sits above the support ring 140 but still within the interior 125 of the port body 102. Prior to crimping, the port body 102 has a proximal crimp portion 112 which is shaped like a hollow cylinder with a uniform inner diameter at the top at the top of the port body 102 (FIG. 10A). When the user wishes to create an upper seal 135, a crimping device is employed to force proximal crimp portion 112 of the port body 102 radially inward and down. The proximal crimp portion 112 folds into the flexible flange 152 of the electrical connector 104 and forms the upper seal between the electrical connector 104, the support ring 140, and the port body 102 (See FIG. 3). An environmental sealant 148 can be applied between the port body 102 and the electrical connector 104, as part of the upper seal 135, to further ensure an effective seal. Preferentially, the location of sealant 148 is above the flexible flange 152, between the port body 102 and the electrical connector 104. During the crimping process, the flexibility of the flexible flange 152 allows for the majority of the compression force to transfer to the support ring 140 as the crimp portion 112 contacts the support ring 140. The support ring 140 is made from a more rigid material than the electrical connector 104 (i.e. metal versus plastic) such that the support ring 140 bears the brunt of the compression load. For example, the support ring 140 can be made from a material that, as compared to the electrical connector 104, requires a much a greater load (more force) to deform a like distance. Additionally, the force between the flexible flange 152 and the metal crimp portion 112 of the port body 102 is small, but preferably large enough to prevent ingress of the environmental sealant 148 when dispensed and cured.

The upper seal 135 acts to seal the interior 125 of the port body 102. The upper seal 135 includes the proximal crimp portion 112 of the port body 102 that serves the purpose of holding other components of the sensor 100 in close proximity to one another. For example, the proximal crimp 112 can be a rigid material and, when crimped to form the upper seal 135, holds the electrical connector 104, support ring 140, sense element assembly 134, and base cover 130 between the proximal crimp 112 and a lower surface 131 of the port body 102. This prevents significant movement between the components to ensure minimal wear and longevity when the pressure assembly 100 is moved or handled. Further, the force provided by the proximal crimp 112 helps hold the contact pads 176 of the circuit module 136 in contact with the support ring 140 to provide electrical coupling to the port body 102 for the sense element assembly 134. The upper seal 135 also includes the environmental sealant 148 to provide additional sealing.

Figure 12A:
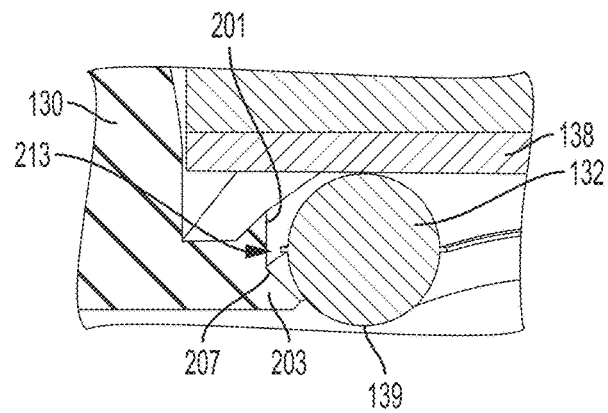
FIG. 12A is a zoomed in cross-section of an annular seal, base cover, and sense element assembly in accordance with the subject technology prior to being crimped.
Figure 12B:
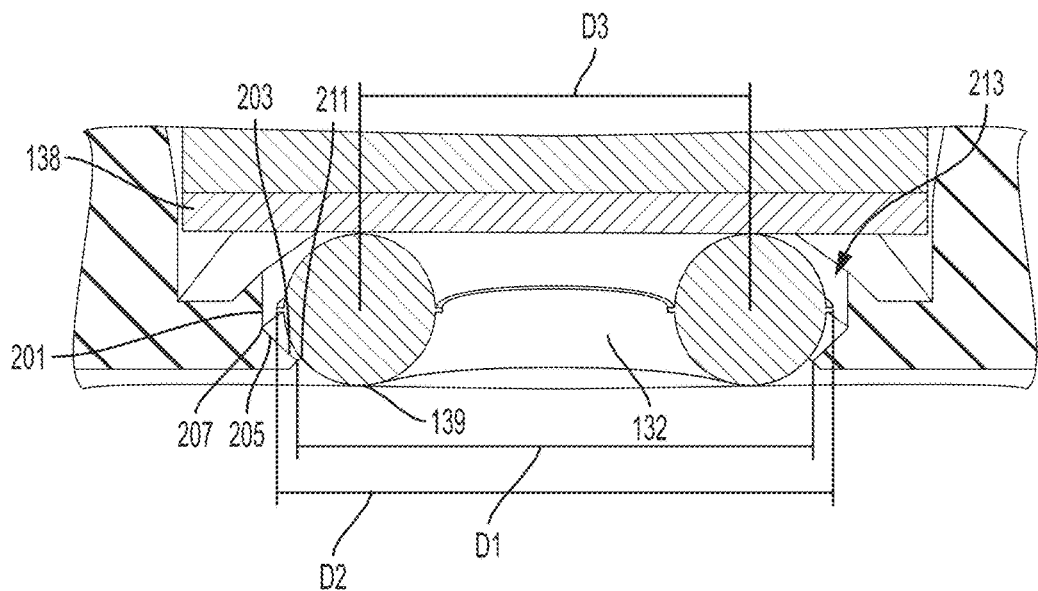
FIG. 12B is another zoomed in cross-section of an annular seal, base cover, and sense element assembly in accordance with the subject technology prior to being crimped.
Figure 12C:
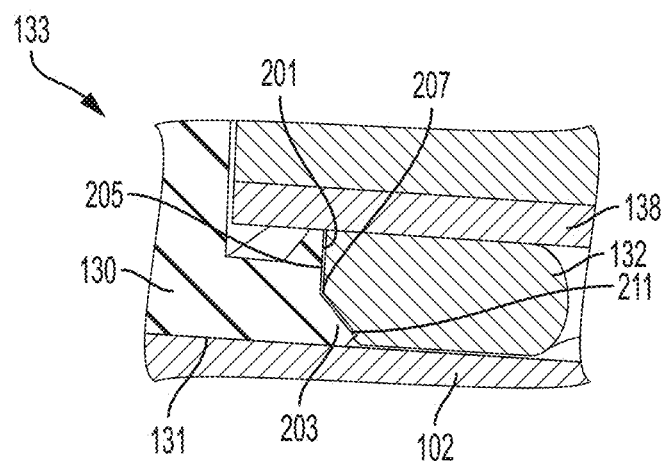
FIG. 12C is a zoomed in cross-section of an annular seal, base cover, sense element assembly, and port body in accordance with the subject technology after the port body is crimped.

Referring now to FIGS. 12A-12C, the force exerted during the crimping process on the support ring 140 to form the upper seal 135 also causes compression of the lower annular seal 132 to form a tight seal between the port body 102, base cover 104, and sense element 138 around the axial passage 108 as the compression force is transmitted by the support ring 140 and to a lesser extent the electrical connector 104. Because the support ring 140 is stronger than the plastic electrical connector 104, the crimp force applied to the support ring 140 can be relatively greater. As a result, more effective compression of the sensor 100 components together, which enables a better electrical connection between the support ring 140 and the pads 176 of the sense element assembly 134 can occur. FIGS. 12A and 12B show the annular seal 132 in position within the base cover 130 prior to the crimping around the upper seal 135 taking place. FIG. 12C shows the annular seal 132 after the crimping takes place, the force of the crimping having deformed and pressed the lower annular seal 132 into contact with the base surface 131 of the port body 102 around the axial passage 108.

Initially, the annular seal 132 sits within the recess 205 in the base cover 130, defined between opposing annular ridges 201, 203. When uncompressed, the annular seal 132 is shaped like a toroidal or cylindrical ring. The upper annular ridge 201 slopes slightly axially inward from a central portion 207 within the recess 205 to create the outer boundary wall of sealing gland and help retain the annular seal 132. In some embodiments a straight cylindrical sidewall is the preferred interior shape of ridge 201, as sloping may reduce sealing potential. The lower annular ridge 203 slopes from the central portion 207 at a sharper slope than the upper annular ridge 201 to provide a seat for the annular seal 132 and retain the annular seal 132 in the sensor 100 assembly during manufacture. Optionally, at a narrowest point 211 of the skirt 202, the lower annular ridge 203 has a diameter "D1" that is less than an outer diameter "D2" of the annular seal 132 but greater than a central diameter "D3" of the annular seal 132. The smaller diameter D1 of the lower annular ridge 203 as compared to the larger outer diameter D2 of the annular seal 132 allows the base cover 130 to hold the annular seal 132 in place within the recess 205 and prevent the seal 132 from slipping out the axial bore 194. Meanwhile, since the diameter D2 of the lower annular ridge 203 is greater than the central diameter D3 of the annular seal 132, the bottom 139 of the annular seal 132 extends below the bottom of the base cover 130 (i.e. the bottom 139 of the annular seal 132 protrudes slightly through the axial bore 194). Upon crimping, the base 131 of the port body 102 is flush with the annular seal 132 and the distal end of the base cover 130 comes in contact with the base 131 of the port body 102 to form the lower seal 133. Notably, the slopes and dimensions shown are by way of example. In other embodiments, any of the slopes and dimensions associated with one annular ridge 201, 203 can be realized by the other annular ridge 201, 203.

As described above, once the crimping force is applied, the annular seal 132 is compressed between the sense element 138, base cover 130, and base 131 of the port body 102 to form the lower seal 133 (See FIG. 12C). Typically, the annular seal 132 is formed from a material that is more easily compressed than the base cover 130 (i.e. rubber compared to a harder plastic), such that the annular seal 132 will deform in response to a compression force before the base cover 130. However, the ramp shape created by the annular ridges 201, 203 which form the recess 205 acts to minimize the flexure when the seal 132 is compressed. For example, as shown in FIG. 12C, the force applied from the crimping primarily causes the annular seal 132 to be pinched between the sense element 138 and the base 131 of the port body 102. This force causes the height of the annular seal 132 to be compressed. Initial axial compression of the seal 132 expands the seal 132 radially mostly outward, but also inward. As the seal 132 is compressed axially, the annular seal 132 to expands radially and fills the gap 213 between the annular seal 132 and the recess 205 within the base cover 130. Further outward radial expansion of the seal 132 is limited by the annular ridges 201, 203 of the base cover 130. Since volume is still conserved, the seal 132 continues to expand inward. The upper annular ridge 201 compresses or crushes due force exerted from the crimped portion 112 of the port body 102 via the support ring 140 and sense element 138. In some embodiments the upper annular ridge 201 does not flex toward the port body, such that any force required to cause flexion is removed from the interface between the seal 132 and the port body 102, increasing the ability of the sensor 100 assembly to seal. In some embodiments annular ridge 203 has no impact on extrusion. Presence of the annular ridge 201 prevents extrusion of annular seal 132 because the annular ridge 201 allows for a smaller gap than would otherwise be possible due to tolerancing. The annular ridges 201, 203 work to retain the annular seal 132 within the base cover 130 even after compression and avoid extrusion of the annular seal 132. This helps provide a reliable seal between the fluid in the axial passage 108 and the interior 125 of the port body 102. Notably, formation of the lower seal 133 is discussed as a result of the crimping force, the components discussed are equally effective at providing a seal when other compression forces are applied to pinch the annular seal 132 and/or hold the components (i.e. the base cover 130, annular seal 132, sense element 138, and/or port body 102) together.

In another embodiment, an assembly for sealing a passageway exposed to fluid flow is described. This assembly contains a first body, a second body, and an annular seal. The first body includes a distal end defining an axial passage, a first sidewall extending from the distal end to define an interior, and a skirt defining an axial bore. The skirt contains a ledge that extends radially inward from the skirt and terminates in two opposing annular ridges to form a recess therebetween. The annular seal is seated at least partially within the recess. When the annular seal is compressed between the first and second bodies, the interior of the passageway is sealed from the fluid. In some embodiments the first body is the port body and the second body is the sense element. The assembly for sealing a passageway can be used to seal items such as pipes or other fluid containing passageways. The assembly for sealing a passageway is particularly advantageous at high pressures, where a mismatch of tolerances at the flanges of the passageway could result in risk of seal extrusion.

In one embodiment the sensor 100 described above utilizes a lower cost ceramic capacitive sense element while significantly increasing the allowable pressure sensing of up to at least 70 bar (whereas prior art devices are typically only capable of sensing pressure up to approximately 35 bar). Further the sensor is just as accurate and can sense pressure in at least as large of a range. In another embodiment, sensor 100 is designed for 70 bar, but is applicable at higher bar such as 100 bar.

It will be appreciated by those of ordinary skill in the pertinent art that the functions of several elements may, in alternative embodiments, be carried out by fewer elements or a single element. Similarly, in some embodiments, any functional element may perform fewer, or different, operations than those described with respect to the illustrated embodiment. Also, functional elements (e.g., electronics, pressure sensing elements, seals, and the like) shown as distinct for purposes of illustration may be incorporated within other functional elements in a particular implementation.

While the subject technology has been described with respect to preferred embodiments, those skilled in the art will readily appreciate that various changes and/or modifications can be made to the subject technology without departing from the spirit or scope of the subject technology. For example, each claim may depend from any or all claims in a multiple dependent manner even though such has not been originally claimed.

What is claimed is:

1. A sensor for sensing a pressure associated with a fluid comprising:
 a port body including: a distal end defining an axial passage for receiving the fluid; and a first sidewall extending from the distal end and terminating in a proximal crimp portion defining an opening;
 an electrical connector including a shoulder extending through the opening with a flexible flange within the port body, the electrical connector and the port body defining an interior for a plurality of components; and
 a support ring in the interior, the support ring having an upper surface with a radially inward ledge that acts as a stop for the shoulder and, in turn, sets a gap between the upper surface and the flexible flange,
 wherein the proximal crimp portion is crimped down on the flexible flange to form an upper seal.

2. The sensor as recited in claim 1, further comprising:
 a base cover in the interior between the support ring and the axial passage, the base cover and support ring forming a cavity and retaining a sense element assembly therewithin.

3. The sensor as recited in claim 1, further comprising at least one contact pad disposed on a surface of the sense element assembly,
 wherein:
 the support ring is a conductive material; and
 the proximal crimp portion applies a loading force to the support ring, causing the support ring to maintain contact with the at least one contact pad.

4. The sensor as recited in claim 1, wherein: the sensor is a pressure sensor; and the support ring is of more rigid material than the electrical connector.

5. The sensor as recited in claim 1, further comprising an environmental sealant applied to a junction of the proximal crimp portion and the flexible flange.

6. An assembly for sealing a passageway with a fluid passing therethrough, the assembly comprising:
 a first body including: a distal end defining an axial passage; a first sidewall extending from the distal end to define an interior; and a skirt defining an axial bore and having a ledge extending radially inward from the skirt and terminating in two opposing annular ridges to form a recess therebetween;
 a second body; and
 an annular seal seated at least partially within the recess, wherein when the annular seal is compressed between the first body and the second body, the interior is sealed from the fluid.

7. An assembly as recited in claim 6 further comprising a base cover in the interior including a side wall,
 wherein the first body is a port body and the second body is a sense element within the interior exposed to the fluid via the axial bore.

8. The sensor as recited in claim 6 wherein the annular seal, when not compressed, has an outer diameter that is less than a central diameter of the recess such that a gap is formed between the annular seal and the recess.

9. The sensor as recited in claim 6 wherein the opposing annular ridges have inner diameters that are greater than the central diameter of the annular seal.

10. The sensor as recited in claim 6 wherein one of the opposing annular ridges has an inner diameter that is less than the outer diameter of the annular seal.

11. The sensor as recited in claim 6 wherein the annular ridges are thin such that when a compression force causes the annular seal to expand radially outward within the recess, the annular ridges will flex to retain the annular seal in the recess.

12. An elongated sensor comprising:
 a support ring;
 at least one axial channel extending through the support ring;
 an electrical connector including at least one latch extending distally into the at least one axial channel of the support ring; and a base cover with at least one upstanding finger that extends into the at least one axial channel of the support ring and couples with the at least one latch of the electrical connector.

13. The sensor as recited in claim 12 further comprising a sense element assembly disposed in between the base cover and the support ring, wherein when the at least one upstanding finger is coupled to the at least one latch, the electrical connector, support ring, sense element assembly, and base cover resist movement with respect to one another.

14. The sensor as recited in claim 12 wherein:
the sensor is a pressure sensor;
the sense element assembly includes a circuit module coupled to a sense element, the circuit module having at least one contact pad on an upper surface;
the support ring is grounded and formed from a conductive material; and
when the at least one upstanding finger is coupled to the at least one latch, the at least one contact pad is held in contact with the support ring to ground the circuit module.

15. The sensor as in claim 12 wherein:
each of the at least one axial channels further include axial recesses in an outer sidewall of the support ring; and
when the at least one upstanding finger is coupled to the at least one latch, the axial recesses house the at least one upstanding finger and resist twisting of the base cover with respect to the support ring.

16. A sensor comprising:
a port body defining an interior;
a conductive support ring in the interior having a contact surface;
a sense element assembly in the interior;
a circuit module electrically connected to the sense element assembly having at least one pad between the circuit module and the contact surface,
wherein the at least one pad provides an electrical contact through the support ring for preventing electromagnetic interference on the sense element assembly.

17. The sensor as recited in claim 16 wherein: the sensor is a pressure sensor; and the conductive ring is in contact with the port body and the port body is grounded.

18. The sensor as recited in claim 17, further comprising a seal that provides a loading force to maintain contact between the at least one pad and the support ring.

19. The sensor as recited in claim 17, wherein the support ring is symmetric around a central plane for simplified assembly.

20. An elongated sensor for sensing a pressure associated with a fluid comprising:
a port body including: a distal end defining an axial passage for receiving the fluid; and a first sidewall extending from the distal end and terminating in a proximal crimp portion defining an opening;
an electrical connector including a shoulder extending through the opening with a flexible flange within the port body, the electrical connector and the port body defining an interior;
a conductive support ring in the interior having a lower contact surface and an upper surface having a radially inward ledge that acts as a stop for the shoulder and, in turn, sets a gap between the upper surface and the flexible flange;
at least one axial channel extending between the upper surface and lower surface of the conductive support ring;
at least one latch extending distally from the electrical connector into the at least one axial channel of the conductive support ring;
a base cover in the interior including: at least one upstanding finger that extends proximally into the at least one axial channel of the conductive support ring and couples with the at least one latch of the electrical connector; and a skirt defining an axial bore and having a ledge extending radially inward from the skirt and terminating in two opposing annular ridges to form a recess therebetween;
a sense element within a cavity defined by the electrical connector, the conductive support ring, and the base cover, the sense element having a lower surface exposed to the fluid via the axial bore;
a circuit module within the cavity coupled to the sense element, the circuit module having at least one contact pad touching the lower surface of the conductive support ring; and
an annular seal within the recess, the annular seal contacting the port body, base cover, and sense element to form a lower seal between the axial passage and the cavity,
wherein the proximal crimp portion is crimped down on the flexible flange to form an upper seal and apply a force to the conductive support ring such that: the conductive support ring remains in contact with the at least one contact pad to prevent electromagnetic interference on the circuit module and sense element; and the annular seal is compressed to maintain the lower seal.

* * * * *